(12) United States Patent
Matsui et al.

(10) Patent No.: US 7,832,940 B2
(45) Date of Patent: Nov. 16, 2010

(54) METHOD OF PRODUCING ROLLING BEARING DEVICE

(75) Inventors: Syunichi Matsui, Osaka (JP); Tatsuya Yokota, Osaka (JP)

(73) Assignee: JTEKT Corporation, Osaka-shi (JP)

( * ) Notice: Subject to any disclaimer, the term of this patent is extended or adjusted under 35 U.S.C. 154(b) by 674 days.

(21) Appl. No.: 11/791,907

(22) PCT Filed: Nov. 29, 2005

(86) PCT No.: PCT/JP2005/021859

§ 371 (c)(1),
(2), (4) Date: May 30, 2007

(87) PCT Pub. No.: WO2006/059591

PCT Pub. Date: Jun. 8, 2006

(65) Prior Publication Data

US 2008/0118197 A1   May 22, 2008

(30) Foreign Application Priority Data

Nov. 30, 2004   (JP) ............................. 2004-345899

(51) Int. Cl.
*F16C 35/063*   (2006.01)
*B21D 39/04*   (2006.01)

(52) U.S. Cl. .................... 384/544; 28/898.09

(58) Field of Classification Search ................ 384/544, 384/589, 537, 584; 29/898.07, 898.06, 898.061, 29/898.062, 898.09, 724
See application file for complete search history.

(56) References Cited

U.S. PATENT DOCUMENTS

| | | | |
|---|---|---|---|
| 5,226,738 A | | 7/1993 | Valette et al. |
| 5,911,458 A | * | 6/1999 | Bywalez et al. ........ 29/898.062 |
| 5,974,665 A | * | 11/1999 | Frielingsdorf et al. .... 29/898.09 |
| 6,170,919 B1 | * | 1/2001 | Hofmann et al. ............ 384/544 |
| 6,814,495 B2 | * | 11/2004 | Toda et al. .................. 384/544 |
| 2003/0138176 A1 | * | 7/2003 | Umekawa et al. ........... 384/544 |

FOREIGN PATENT DOCUMENTS

| | | |
|---|---|---|
| JP | 2000-289403 | 10/2000 |
| JP | 2001-162338 | 6/2001 |
| JP | 2001-353538 | 12/2001 |
| JP | 2002-339959 | 11/2002 |
| JP | 2003-172371 | 6/2003 |

* cited by examiner

*Primary Examiner*—Thomas R Hannon
(74) *Attorney, Agent, or Firm*—Jordan and Hamburg LLP

(57) ABSTRACT

An inner ring is fitted on one-end side of an inner shaft and fixed to the inner shaft by caulking. During the caulking, the inner shaft is supported by a caulking receiving jig. A receiving section to which the jig is in contact is provided at a position near the one-end side of the inner shaft, for example, at a position nearer to the inner ring than a raceway section formed on the outer periphery on the other side of the inner shaft. As a result, a caulking load acting from a caulking jig on the inner shaft plastically deforms only a desired portion.

20 Claims, 3 Drawing Sheets

F I G. 1
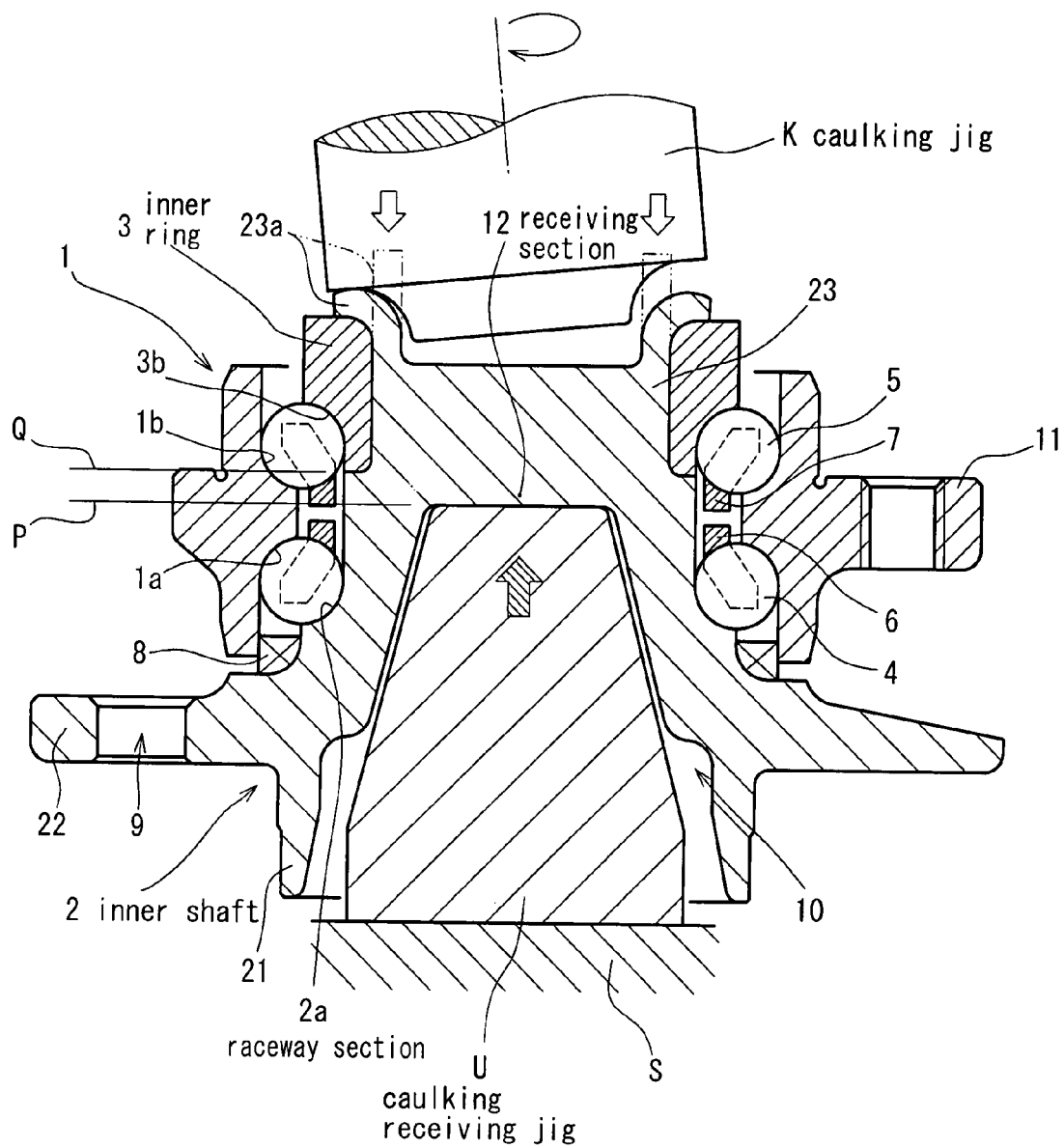

METHOD OF PRODUCING ROLLING BEARING DEVICE

BACKGROUND OF THE INVENTION

The present invention relates to a method of producing a rolling bearing device, more particularly to a method of securing an inner ring externally mounted on an inner shaft to the inner shaft by caulking one-end side of the inner shaft.

There is such a type that an inner ring is fixed to be externally engaged on one-end side of an inner shaft provided on an inner-diameter side of an outer ring in a rolling bearing device used for supporting a wheel of a motor vehicle. As an example of a method of producing the rolling bearing device of this type, there is a method of securing the inner ring to the inner shaft by caulking the one-end side of the inner shaft onto an outer end surface of the inner ring (see the Patent Literature 1).

Patent Literature 1: No. 2002-339959 of the Japanese Patent Applications Laid-Open The conventional producing method where the caulking is adopted has such a problem that a raceway section of the inner ring is slightly deformed.

SUMMARY OF THE INVENTION

The inventors of the present invention found out the following in a process of devising the present invention. More specifically, in the conventional producing method, a wheel mounting surface of a flange part for mounting a wheel and an inner end part of a spigot joint part, which are on another-end side of an inner shaft, are used as receiving sections for receiving a caulking load, the receiving sections are abutted by a caulking receiving jig so that the inner shaft is supported, and then, the one-end side of the inner shaft is caulked. In the rolling bearing device produced by means of the conventional producing method, therefore, a large distance is formed between the one-end side of the inner shaft and the caulking receiving tool. As a result, in the case where the caulking load is increased in order to, for example, obtain an necessary axial force, the caulking load acts on parts which originally do not require the caulking load because the large distance is generated, and thereby, it may generate such an inconvenience that a raceway section of the inner ring is slightly deformed.

The present invention solves the foregoing problem by adopting the following constitution based on the knowledge described above. In other words, a method of producing a rolling bearing device according to the present invention is a method wherein one-end side of an inner shaft is caulked onto an end surface of an inner ring externally engaged on the inner shaft, and a receiving section subject to a stress applied to the inner shaft in the caulking is formed in vicinity of the one-end side of the inner shaft so that the caulking is implemented while supporting the receiving section by a caulking receiving jig.

According to the foregoing constitution, in the present invention, the stress applied to the inner shaft when the end surface of the inner ring on the one-end side of the inner shaft is caulked can be received at a position in vicinity of the one-end side of the inner shaft, and as a result, a load necessary for the caulking can be transmitted alternatively to a part of the inner shaft which requires the load. Therefore, when a required preload is applied to the bearing part, the inner ring can be secured lest it is slipped out in an axial outward direction. The rolling bearing device can be thereby produced without generating even a slight deformation in a raceway section of the inner shaft, a raceway section of the inner ring and the like.

In order to achieve the foregoing effect, the receiving section is preferably provided at an axial position between the raceway section of the inner shaft and the part on which a caulking jig is operated. However, since the part to which the inner ring is secured has a small diameter conventionally, a thickness of the small-diameter part could have been too thin if the receiving section is provided at a position axially corresponding to the small-diameter part. Therefore, it is more preferable that the receiving section is provided, not at any position in the small-diameter part, but at an axial position between the raceway section of the inner shaft and the inner ring.

The inner shaft may be solid or hollow with a bearing hole at a central part thereof. In the case where the inner shaft is hollow, it is preferable that the receiving section is formed at an axial position closer to the inner ring than the raceway section of the inner shaft and a radial position facing a region axially rightly opposed to the part on which the caulking jig is operated in an inner periphery of the hollow part.

According to the foregoing constitution, the receiving section can be axially and radially close to the inner ring and can thereby receive the caulking load operating from the caulking jig at the position very close to the inner ring. Accordingly, the caulking load transmitted to the part where the caulking load is originally unnecessary can be lessened, which reliably prevents the deformation of the part in which the caulking load is unnecessary.

According to the present invention, the caulking can be performed without transmitting the stress applied to the inner shaft to the part in which the caulking load is unnecessary. As a result, a rolling bearing device having a necessary axial force can be produced without any adverse influence such as the slight deformation of the raceway section or the like.

BRIEF DESCRIPTION OF THE DRAWINGS

FIG. 1 is an axially sectional view showing the state on the way of a process producing a rolling bearing device used for the implementation of the present invention.

DETAILED DESCRIPTION OF THE INVENTION

Figure 2:
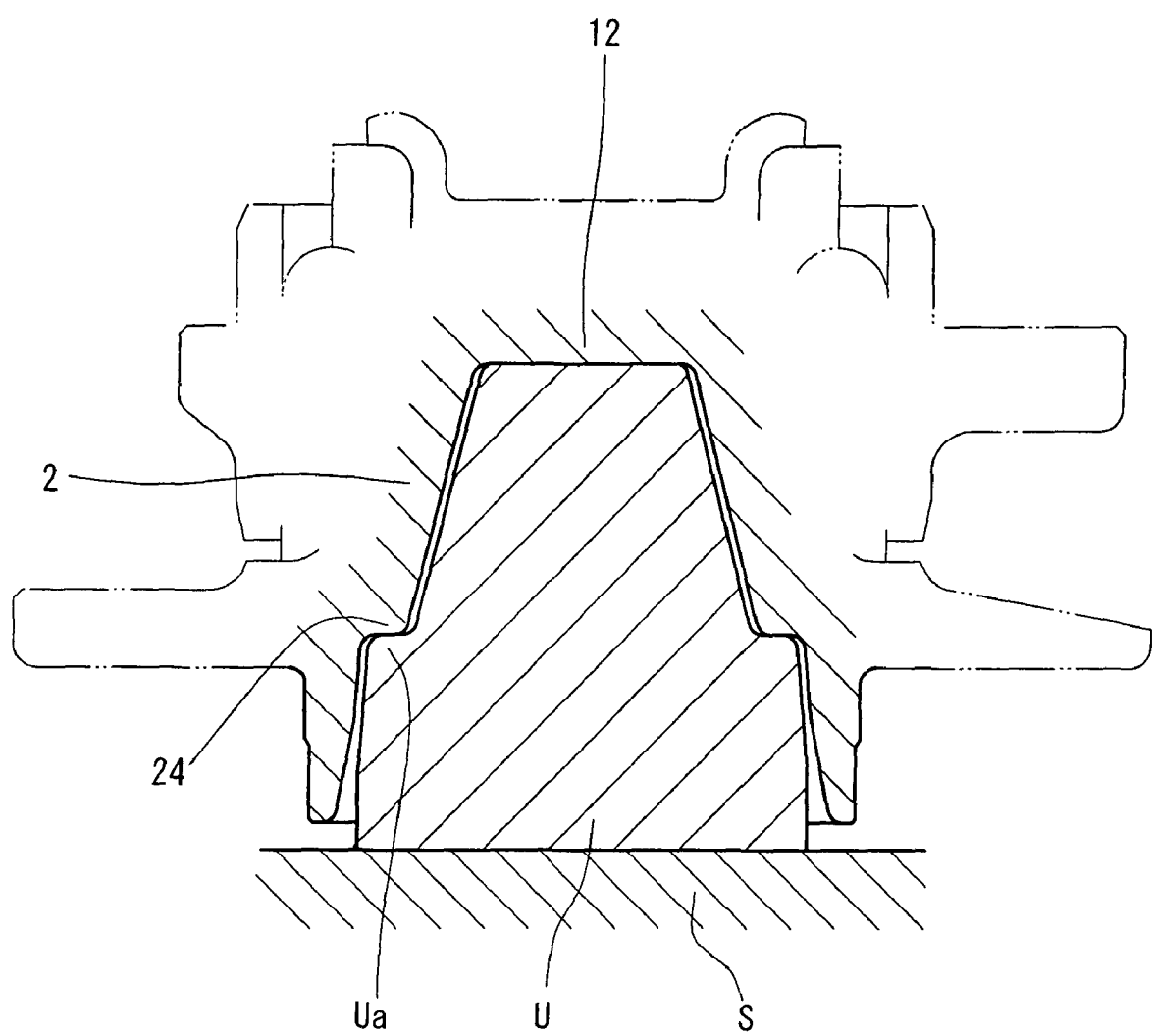
FIG. 2 is an axially sectional view of a schematic shape of a modified example of the rolling bearing device shown in FIG. 1.

Referring to FIG. 1, preferred embodiments of the present invention are described. FIG. 1 is an axially sectional view of a rolling bearing device according to the present invention, wherein the rolling bearing device on the way of a producing process is shown.

The rolling bearing device according to the present preferred embodiment is a type of a double-row angular ball bearing for supporting a driven wheel of a motor vehicle, comprising an outer ring 1, an inner shaft 2, an inner ring 3, a plurality of balls 4 and 5 as rolling bodies, cages 6 and 7 and a seal 8.

The outer ring 1 is secured to a vehicle-body side such as a carrier via a flange part 11 provided on an outer circumferential surface thereof, and raceway sections 1a and 1b are formed in double rows on an inner circumferential surface thereof.

A spigot joint part 21, a flange part 22 for mounting a wheel and a raceway section 2a are formed on a vehicle-outer side of the inner shaft 2 (lower-end side in FIG. 1). Mounting holes 9 axially penetrating through are formed at a plurality of circumferential positions of the flange part 22, and bolts for securing a disc rotor and a wheel of a disc brake device (not shown) can be pressed into these mounting holes 9 from a vehicle-inner side. A small-diameter part 23 is formed on the vehicle-inner side of the inner shaft 2 (upper-end side in FIG. 1), and a cylindrical part serving as a caulking part (both are shown by 23a) is provided at an edge of the small-diameter part 23.

The inner ring 3 comprises a raceway section 3b facing the raceway section 1b of the outer ring on an outer peripheral surface thereof, and is externally mounted on an outer peripheral surface of the small-diameter part 23 of the inner shaft 2. The cylindrical part 23a of the small-diameter part 23 is caulked radially outward by a caulking jig K so that the inner ring 3 is secured to the inner shaft 2.

The balls 4 and 5 are provided in double rows in a facing space between the raceway pars 1a, 1b, 2a and 3b, and are retained by the cages 6 and 7 so as to freely roll. The seal 8 seals a bearing space between the outer ring 1 and the inner shaft 2.

In the present preferred embodiment, the inner shaft 2 is solid, and a recessed part 10 opened toward the vehicle-outer side is formed on a radially inner side thereof. A caulking receiving jig U abuts a bottom part of the recessed part 10, and the recessed part 10 (in particular, bottom part thereof) thereby serves as a receiving section 12 subject to a stress applied to the inner shaft 2 at the time of the caulking. The receiving section 12 desirably has a large diameter for receiving a caulking load. Further, it is necessary to set the diameter of the receiving section 12 so that an enough thickness can be provided between the recessed part 10, and the raceway section 2a of the inner shaft 2 and the outer peripheral surface of the small-diameter part 23. An axial position P of the receiving section 12 may be a position more axially inward of the inner shaft than the raceway section 2a of the inner shaft 2 (position axially closer to the inner ring 3). In the present preferred embodiment, the axial position P is set to a position before an axial position Q (position axially closer to the raceway section 2a) of an inner end surface of the inner ring 3 (small end surface in the example shown in the drawing) based on the following reason. The diameter of the section of the inner shaft 2 where the inner ring 3 is provided is small (small-diameter part 23) in comparison to any other axial position of the inner ring. Therefore, the axial position P of the receiving section 12 is set to the position before the axial position Q (position axially closer to the raceway section 2a, that is, lower side in FIG. 1) on the inner end surface of the inner ring 3 (small end surface in the example shown in FIG. 1) so that the section where the receiving section 12 is provided does not overlap with the section where the inner ring 3 is provided in order to prevent the thickness of the small-diameter part from becoming too thin.

When the caulking process is performed in the producing of the rolling bearing device thus constituted, first, the outer ring 1, inner shaft 2, inner ring 3, balls 4 and 5 and the like are assembled in the state shown in FIG. 1. Then, the assembly is set in the upright position so that the flange part 22 for mounting the wheel is at the bottom, and the columnar caulking receiving jig U is made to abut the receiving section 12 of the inner shaft 2 so that the receiving section 12 is supported on a substrate S via the caulking receiving jig U. The caulking jig K is then made to abut the cylindrical part 23a of the inner shaft 2 protruding more upward than the inner ring 3 so as to rolling-caulk the cylindrical part 23a by rotating the caulking jig K while oscillating it around a vertical axis. Then, the cylindrical part 23a of the inner shaft 2 is plastically deformed radially outward so that the inner ring 3 is secured to the inner shaft 2.

In the foregoing case, as shown in outline arrows in FIG. 1, the caulking load acting on the cylindrical part 23a of the inner shaft 2 and the caulking part 23a generated from the cylindrical part 23a is received by the caulking receiving jig U via the receiving section 12 (the arrows shown in the caulking receiving jig U denote reactions resulting from the reception of the caulking load. The stress resulting from the caulking is generated mainly in from the cylindrical part 23a through to the receiving section 12 among the respective sections of the inner shaft 2, and rarely generated in any part lower than the receiving section 12. Therefore, there is no risk of deformation of the raceway section 2a of the inner shaft 2 and the like.

In addition, when the caulking to the inner shaft 2 is completed, the seal is attached between the inner ring 3 and the outer ring 1, and the bolts are respectively pressed into the mounting holes 9 of the flange part 22 for mounting the wheel in the inner shaft 2.

FIG. 2 shows a modified embodiment of the preferred embodiment shown in FIG. 1. In the case where the recessed part 10 of the inner shaft 2 has such a shape that is recessed in two steps and a shaft step part 24 is present in an inner periphery of the inner shaft 2 as shown in FIG. 2, a jig step part Ua is formed in an outer periphery of the caulking receiving jig U so that the caulking receiving jig U has such a shape that protrudes in a step shape corresponding to the shape of the recessed part 10 (shaft step part 24). Accordingly, the shaft step part 24 is made to abut the jig step part Ua of the caulking receiving jig U so that the shaft step part 24 of the inner shaft 2 functions as a second receiving section for receiving the caulking load.

Figure 3:
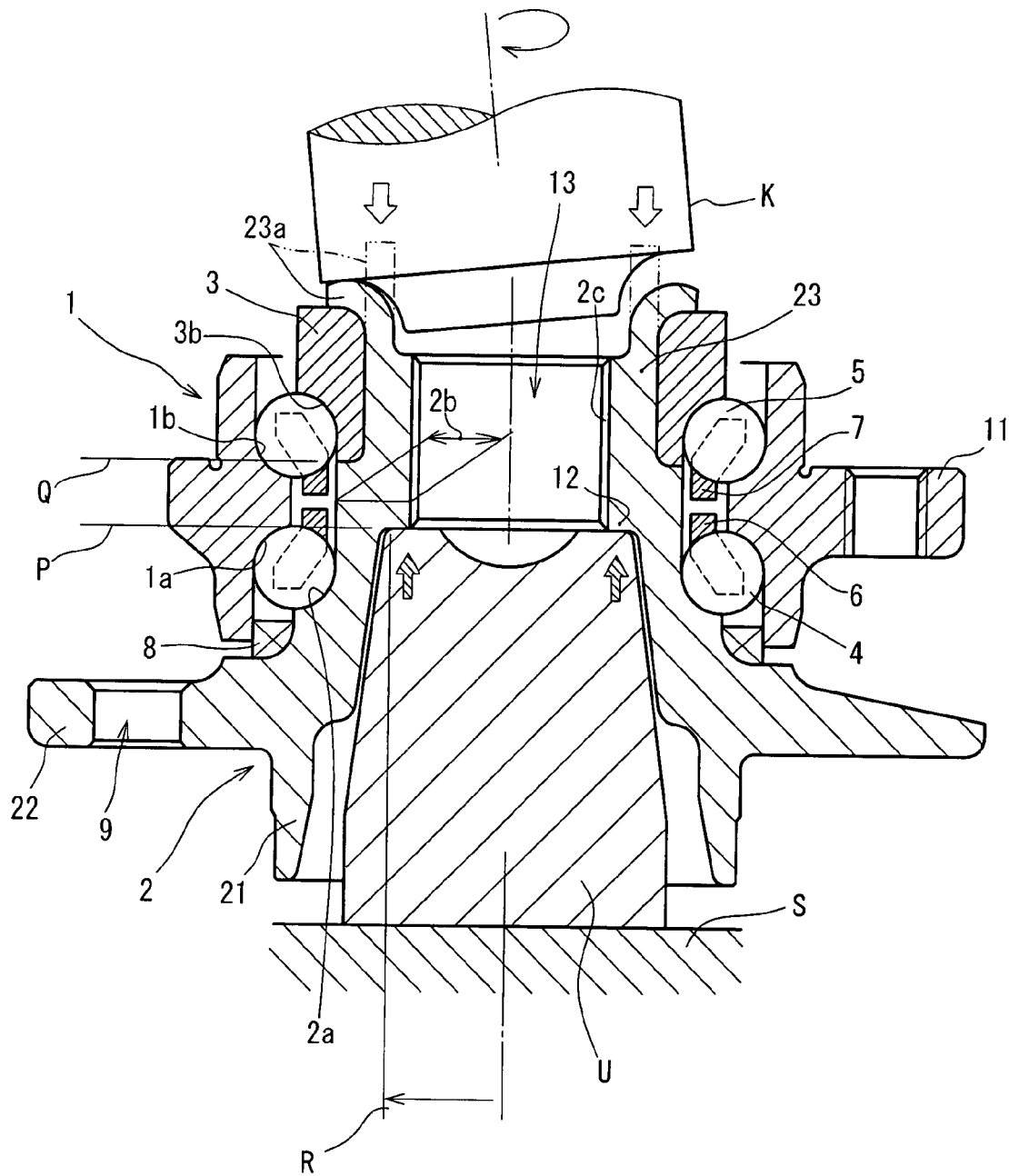
FIG. 3 is an axially sectional view showing the state on the way of a process producing a rolling bearing device used according to another preferred embodiment of the present invention.

Next, another preferred embodiment of the present invention is described referring to FIG. 3. The inner shaft 2 is hollow and has a bearing hole 13 at the center thereof. In the inner shaft 2 thus constituted, a step-shape receiving section 12 to which the caulking receiving jig U is made to abut is formed across an entire inner periphery of the hollow part.

A position of the receiving section 12 is an axial position closer to the inner ring 3 than the raceway section 2a of the inner shaft 2, and set to a radial position R partly or entirely included in a region axially rightly opposed to the section where the caulking jig K of the inner shaft 2 acts (more specifically, the cylindrical part 23a of the inner shaft 2 and the caulking part formed from the cylindrical part 23a). The region is a region corresponding to a thickness 2b of the inner shaft 2 between the raceway section 2a of the inner shaft 2 and the inner ring 3. A spline 2c is formed in the inner periphery of the hollow part closer to a caulking part 23a than the receiving section 12.

In this constitution, the receiving section 12 can be axially and radially close to the inner ring 3, and receives the caulking load acting from the caulking jig K at a front position very close to the inner ring 3, which reliably prevents any undesirable part from being unnecessarily deformed.

The producing method according to the present invention is not necessarily limited to the producing of the rolling bearing device wherein the balls are used as the rolling bodies, and can be applied to the producing of rolling bearing devices of various types wherein tapered rollings and cylin drical rollings can used as the rolling bodies as far as these rolling bearing devices are used in such a manner that an inner ring is secured to one end side of an inner shaft by caulking.

What is claimed is:

1. A method of producing a rolling bearing device, wherein
one-end side of an inner shaft is caulked onto an end surface of an inner ring externally mounted on the inner shaft,
a receiving section subjected to a stress applied to the inner shaft in the caulking is formed in vicinity of the one-end side of the inner shaft, and
the one-end side of the inner shaft is caulked onto the end surface of the inner ring with the receiving section being supported by a caulking receiving jig, the inner shaft comprising a small-diameter part and the receiving section is provided, not at any position in the small-diameter part, but at an axial position between a raceway section provided in the inner shaft and the inner ring.

2. The method of producing the rolling bearing device as claimed in claim 1, wherein the inner shaft has a hollow structure and the receiving section is formed at an axial position closer to the inner ring than the raceway section of the inner shaft and at a radial position facing a region axially rightly opposed to the part on which a caulking jig acts in an inner periphery of the hollow structure of the inner shaft.

3. A method of producing a rolling bearing device, wherein
one-end side of an inner shaft is caulked onto an end surface of an inner ring externally mounted on the inner shaft,
a receiving section subjected to a stress applied to the inner shaft in the caulking is formed in vicinity of the one-end side of the inner shaft, and
the one-end side of the inner shaft is caulked onto the end surface of the inner ring with the receiving section being supported by a caulking receiving jig, the inner shaft comprising a shaft step part in an inner periphery thereof, and a jig step part along the shaft step part is formed on an outer periphery of the caulking receiving jig, and the shaft step part is made to abut the jig step part so as to function as another receiving part for undergoing a caulking load of the shaft step part.

4. The method of producing the rolling bearing device as claimed in claim 3, wherein
the receiving section is provided at an axial position between a raceway section of the rolling bearing device provided in the inner shaft and a part on which a caulking jig acts.

5. A method of producing a rolling bearing device comprising:
an outer ring secured to a vehicle-body side and provided with double-row raceway sections on an outer-ring side formed on an inner peripheral surface thereof;
an inner shaft provided with a flange part for mounting a wheel and an inner-shaft-side raceway section facing one of the outer-ring-side raceway sections of the outer ring formed on an outer peripheral surface on one-end side thereof and a small-diameter part formed on another-end side thereof;
an inner ring provided with an inner-ring-side raceway section facing the other outer-ring-side raceway section of the outer ring formed on an outer peripheral surface thereof and externally mounted on the small-diameter part of the inner shaft; and
a plurality of rolling bodies provided between the outer-ring-side raceway sections and the inner-shaft-side raceway section and the inner-ring-side raceway section, wherein
the inner shaft comprises a recessed part opened toward the one-end side, and a receiving section subjected to a stress resulting from a caulking process is formed in the recessed part, the inner shaft being provided, not at any position in the small-diameter part, but at an axial position between a raceway section provided in the inner shaft and the inner ring, and
the method including:
a step of assembling the outer ring, the inner shaft, the inner ring and the rolling bodies into an assembly;
a step of providing the assembly on a cylindrical caulking jig with the one-end side of the inner shaft at a bottom part thereof and making the receiving section of the recessed part and an end surface of a caulking receiving jig abut each other; and
a step of increasing an end-part diameter of the small-diameter part of the inner shaft radially outward using the caulking jig and thereby securing the inner ring to the inner shaft.

6. The method of producing the rolling bearing device as claimed in claim 5, wherein the receiving section in the recessed part of the inner shaft is provided at an axial position between the inner-shaft-side raceway section formed in the inner shaft and an end part of the inner ring on one-end side thereof.

7. The method of producing the rolling bearing device as claimed in claim 5, wherein
the recessed part of the inner shaft is formed so as to have a bottom section in a non-penetrating manner, and the bottom section serves as the receiving section.

8. The method of producing the rolling bearing device as claimed in claim 5, wherein
the recessed part of the inner shaft is formed so as to axially penetrate through the inner shaft, and the receiving section is formed in a step shape in an inner peripheral part of the recessed part.

9. A method of producing a rolling bearing device comprising:
an outer ring secured to a vehicle-body side and provided with double-row raceway sections on an outer-ring side formed on an inner peripheral surface thereof;
an inner shaft provided with a flange part for mounting a wheel and an inner-shaft-side raceway section facing one of the outer-ring-side raceway sections of the outer ring formed on an outer peripheral surface on one-end side thereof and a small-diameter part formed on another-end side thereof;
an inner ring provided with an inner-ring-side raceway section facing the other outer-ring-side raceway section of the outer ring formed on an outer peripheral surface thereof and externally mounted on the small-diameter part of the inner shaft; and
a plurality of rolling bodies provided between the outer-ring-side raceway sections and the inner-shaft-side raceway section and the inner-ring-side raceway section, wherein
the inner shaft comprises a recessed part opened toward the one-end side, and a receiving section subjected to a stress resulting from a caulking process is formed in the recessed part, the inner shaft comprising a shaft step part in an inner periphery thereof, and a jig step part along the shaft step part is formed on an outer periphery of a caulking receiving jig, and the shaft step part is made to abut the jig step part so as to function as another receiving part for undergoing a caulking load of the shaft step part, and the method including:

a step of assembling the outer ring, the inner shaft, the inner ring and the rolling bodies into an assembly;

a step of providing the assembly on a cylindrical caulking jig with the one-end side of the inner shaft at a bottom part thereof and making the receiving section of the recessed part and an end surface of a caulking receiving jig abut each other; and a step of increasing an end-part diameter of the small-diameter part of the inner shaft radially outward using the caulking jig and thereby securing the inner ring to the inner shaft.

10. The method of producing the rolling bearing device as claimed in claim 9, wherein the receiving section in the recessed part of the inner shaft is provided at an axial position between the inner-shaft-side raceway section formed in the inner shaft and the caulked part of the small-diameter part.

11. The method of producing the rolling bearing device as claimed in claim 9, wherein the receiving section in the recessed part of the inner shaft is provided at an axial position between the inner-shaft-side raceway section formed in the inner shaft and an end part of the inner ring on one-end side thereof.

12. The method of producing the rolling bearing device as claimed in claim 9, wherein the recessed part of the inner shaft is formed so as to have a bottom section in a non-penetrating manner, and the bottom section serves as the receiving section.

13. A rolling bearing device comprising:

an outer ring secured to a vehicle-body side and provided with double-row bearing sections on an outer-ring side formed on an inner peripheral surface thereof, an inner shaft provided with a flange part for mounting a wheel and an inner-shaft-side raceway section facing one of the outer-ring-side raceway sections of the outer ring via rolling bodies formed on an outer peripheral surface on one-end side thereof and a small-diameter part formed on another-end side thereof; and an inner ring provided with an inner-ring-side raceway section facing the other outer-ring-side raceway section of the outer ring via the rolling bodies formed on an outer peripheral surface thereof, externally mounted on the small-diameter part of the inner shaft, and secured to the inner shaft when an end part of the small-diameter part is caulked, wherein the inner shaft comprises a recessed part opened toward one-end side thereof, and a receiving section subjected to a stress resulting from the caulking is formed in the recessed part, the receiving section being provided, not at any position in the small-diameter part, but at an axial position between a raceway section provided in the inner shaft and the inner ring.

14. The rolling bearing device as claimed in claim 13, wherein the receiving section in the recessed part of the inner shaft is provided at an axial position between the inner-shaft-side raceway section formed in the inner shaft and an end part of the inner ring on one-end side thereof.

15. The rolling bearing device as claimed in claim 13, wherein the recessed part of the inner shaft is formed so as to have a bottom section in a non-penetrating manner, and the bottom section serves as the receiving section.

16. The rolling bearing device as claimed in claim 13, wherein the recessed part of the inner shaft is formed so as to axially penetrate through the inner shaft, and the receiving section is formed in a step shape in an inner peripheral part of the recessed part.

17. A rolling bearing device comprising:

an outer ring secured to a vehicle-body side and provided with double-row bearing sections on an outer-ring side formed on an inner peripheral surface thereof, an inner shaft provided with a flange part for mounting a wheel and an inner-shaft-side raceway section facing one of the outer-ring-side raceway sections of the outer ring via rolling bodies formed on an outer peripheral surface on one-end side thereof and a small-diameter part formed on another-end side thereof; and an inner ring provided with an inner-ring-side raceway section facing the other outer-ring-side raceway section of the outer ring via the rolling bodies formed on an outer peripheral surface thereof, externally mounted on the small-diameter part of the inner shaft, and secured to the inner shaft when an end part of the small-diameter part is caulked, wherein the inner shaft comprises a recessed part opened toward one-end side thereof, and a receiving section subjected to a stress resulting from the caulking is formed in the recessed part, the inner shaft comprising a shaft step part in an inner periphery thereof, and a jig step part along the shaft step part is formed on an outer periphery of a caulking receiving jig, and the shaft step part is made to abut the jig step part so as to function as another receiving part for undergoing a caulking load of the shaft step part.

18. The rolling bearing device as claimed in claim 17, wherein the receiving section in the recessed part of the inner shaft is provided at an axial position between the inner-shaft-side raceway section formed in the inner shaft and the caulked part of the small-diameter part.

19. The rolling bearing device as claimed in claim 17, wherein the receiving section in the recessed part of the inner shaft is provided at an axial position between the inner-shaft-side raceway section formed in the inner shaft and an end part of the inner ring on one-end side thereof.

20. The rolling bearing device as claimed in claim 17, wherein the recessed part of the inner shaft is formed so as to have a bottom section in a non-penetrating manner, and the bottom section serves as the receiving section.

* * * * *